United States Patent
Min et al.

(10) Patent No.: US 9,214,696 B2
(45) Date of Patent: *Dec. 15, 2015

(54) DEGASSING METHOD OF SECONDARY BATTERY USING CENTRIFUGAL FORCE

(71) Applicant: LG CHEM, LTD., Seoul (KR)

(72) Inventors: Ki Hong Min, Gwacheon-si (KR); Sung Min Hwang, Cheongju-si (KR); Jihoon Cho, Daejeon (KR); TaeYoon Jung, Cheongwon-gun (KR); Jeong Sam Son, Cheongju-si (KR); Changmin Han, Cheongju-si (KR); Han Sung Lee, Incheon (KR); Byung Taek Yang, Cheongju-si (KR); Hyun-sook Baik, Cheongju-si (KR); Seok Joo Jung, Cheongju-si (KR); Sung Hyun Kim, Cheongju-si (KR); Ki Hun Song, Hwaseong-si (KR); Sang Hyuck Park, Suwon-si (KR); Byeong Geun Kim, Anyang-si (KR)

(73) Assignee: LG CHEM, LTD., Seoul (KR)

( * ) Notice: Subject to any disclaimer, the term of this patent is extended or adjusted under 35 U.S.C. 154(b) by 7 days.

This patent is subject to a terminal disclaimer.

(21) Appl. No.: 13/894,577

(22) Filed: May 15, 2013

(65) Prior Publication Data

US 2013/0244095 A1    Sep. 19, 2013

Related U.S. Application Data

(63) Continuation of application No. PCT/KR2011/008485, filed on Nov. 9, 2011.

(30) Foreign Application Priority Data

Dec. 2, 2010   (KR) .................. 10-2010-0122335

(51) Int. Cl.
*H01M 10/04* (2006.01)
*H01M 2/36* (2006.01)
(Continued)

(52) U.S. Cl.
CPC ............ *H01M 10/04* (2013.01); *H01M 2/0217* (2013.01); *H01M 2/0287* (2013.01);
(Continued)

(58) Field of Classification Search
CPC .. H01M 10/04; H01M 10/042; H01M 2/0287
USPC .................................... 429/185, 210, 162, 50
See application file for complete search history.

(56) References Cited

U.S. PATENT DOCUMENTS 3,785,873 A * 1/1974 Leeson et al. ................. 429/82
6,114,068 A * 9/2000 Yamada et al.
(Continued)

FOREIGN PATENT DOCUMENTS

JP    7-326338 A    12/1995
JP    10-270072 A   10/1998
(Continued)

OTHER PUBLICATIONS

International Search Report issued in PCT/KR2011/008485, mailed on May 18, 2012.
(Continued)

*Primary Examiner* — Stewart Fraser
*Assistant Examiner* — Olatunji Godo
(74) *Attorney, Agent, or Firm* — Birch, Stewart, Kolasch & Birch, LLP

(57) ABSTRACT

Disclosed is a method for manufacturing a battery cell including an electrode assembly and electrolyte provided in a battery case made of a laminate sheet having a resin layer and a metal layer, which includes: (a) mounting the electrode assembly in the battery case and sealing the periphery of the battery case except for one end part thereof through thermal fusion; (b) introducing the electrolyte through the unsealed end part and sealing the end via thermal fusion; (c) charging-discharging the battery cell to activate the same; (d) transferring gas generated during activation and excess electrolyte to the foregoing end part of the battery cell by centrifugal force; and (e) removing the gas and excess electrolyte from the end part.

13 Claims, 11 Drawing Sheets

(51) Int. Cl.
*H01M 2/02* (2006.01)
*H01M 10/052* (2010.01)
*H01M 10/058* (2010.01)

(52) U.S. Cl.
CPC .............. *H01M2/361* (2013.01); *H01M 2/365* (2013.01); *H01M 10/052* (2013.01); *H01M 10/058* (2013.01); *Y02E 60/122* (2013.01); *Y10T 29/4911* (2015.01); *Y10T 29/49108* (2015.01)

(56) References Cited

U.S. PATENT DOCUMENTS

| | | |
|---|---|---|
| 6,630,060 B1 | 10/2003 | Vaami et al. |
| 2002/0106555 A1* | 8/2002 | Langan .......................... 429/127 |
| 2003/0003363 A1* | 1/2003 | Daido et al. ............. 429/231.95 |
| 2006/0216591 A1* | 9/2006 | Lee ................................ 429/175 |
| 2007/0272548 A1 | 11/2007 | Sutherland et al. |
| 2009/0253038 A1* | 10/2009 | Segawa et al. ................ 429/210 |
| 2013/0244093 A1* | 9/2013 | Min et al. ...................... 429/185 |

FOREIGN PATENT DOCUMENTS

| | | |
|---|---|---|
| JP | 10-308238 A | 11/1998 |
| JP | 2001-57244 A | 2/2001 |
| JP | 2001-93580 A | 4/2001 |
| JP | 2001-158997 A | 6/2001 |
| JP | 2006-278331 A | 10/2006 |
| JP | 2008-97940 A | 4/2008 |
| JP | 2009-187711 A | 8/2009 |
| KR | 10-2007-0040793 A | 4/2007 |
| KR | 10-2010-0118394 A | 11/2010 |
| TW | 200717897 | 5/2007 |
| TW | 200731598 | 8/2007 |

OTHER PUBLICATIONS

Chinese Office Action dated Mar. 18, 2015, for counterpart Chinese Application No. 201180057038.7 with English translation.

* cited by examiner

200b

DEGASSING METHOD OF SECONDARY BATTERY USING CENTRIFUGAL FORCE

CROSS REFERENCE TO RELATED APPLICATIONS

This application is a Continuation of PCT International Application No. PCT/KR2011/008485 filed on Nov. 9, 2011, which claims priority under 35 U.S.C. §119(a) to patent application No. 10-2010-0122335 filed in the Republic of Korea on Dec. 2, 2010, all of which are hereby expressly incorporated by reference into the present application.

TECHNICAL FIELD

The present invention relates to a method for fabrication of a battery cell including an electrode assembly and electrolyte provided in a battery case made of a laminate sheet having a resin layer and a metal layer and, more particularly, a method for manufacturing a battery cell, including: (a) thermally fusing and sealing an outer circumferential face (or the periphery) of the battery case except for an end part thereof while the electrode assembly is mounted in the battery case; (b) introducing the electrolyte through the unsealed end part then sealing the same via thermal fusion; (c) charging and discharging the battery cell to activate the same; (d) transferring excess electrolyte as well as the gas generated in the activation operation to the foregoing end part of the battery cell by centrifugal force; and (e) removing the gas and excess electrolyte from the end part.

BACKGROUND ART

As technological development of mobile instruments and demands thereof are increased, a demand for batteries as an energy source is also increasing. Accordingly, extensive studies into batteries satisfying a number of requirements have been executed.

For representative examples in terms of battery morphology, an angled secondary battery and a pouch type secondary battery, which have a relatively small thickness and are thus applicable for articles such as mobile phones (also known as cellular phones), are in high demand. In terms of raw materials thereof, a lithium secondary battery, i.e., a lithium ion battery, a lithium ion polymer battery, etc., which has advantages such as high energy density, discharge voltage and/or output stability, is widely used.

Alternatively, a secondary battery may be classified in terms of types of a cathode/separator/anode structure of an electrode assembly and include, as representative examples, a jelly-roll (winding type) electrode assembly having a construction of winding a cathode and an anode while interposing a separator therebetween; a stack (laminate type) electrode assembly wherein a plurality of cathodes and anodes cut into pieces to a predetermined unit size are sequentially stacked while interposing a separator therebetween; a stack/folding electrode assembly having a construction of winding bi-cells or full cells, while interposing a separator between a cathode and an anode having a predetermined unit size, and so forth.

Recently, a pouch type battery having a construction of mounting a stack type or a stack/folding type electrode assembly in an aluminum laminate sheet has attracted considerable interest because of low production cost, lightweight, easy variations in shape, etc., and use thereof is also gradually increasing.

FIG. 1 is an exploded perspective view schematically illustrating a general structure of a conventional and typical pouch type battery.

Referring to FIG. 1, a pouch type battery 10 may have an electrode assembly 30, electrode taps 40, 50 extending from the electrode assembly 30, electrode leads 60, 70 welded to the electrode taps 40, 50, and a battery case 20 receiving the electrode assembly 30.

The electrode assembly 30 is a power generating device wherein a cathode and an anode are sequentially laminated while interposing a separator therebetween, and may have a stack type or a stack/folding type structure. The electrode taps 40, 50 may extend from each polar sheet of the electrode assembly 30, while the electrode leads 60, 70 may be electrically connected to a plurality of electrode taps 40, 50, respectively, which extend from the polar sheets, by, for example, welding. Each of the electrode leads 60, 70 may have an insulating film 80 attached to a part of each top or bottom face, in order to improve sealing to the battery case 20 while ensuring electrical insulation thereof.

The battery case 20 may provide a space to receive the electrode assembly 30, and be of a pouch type in terms of morphology thereof. For a laminate type electrode assembly 30 as shown in FIG. 1, in order to combine a plurality of cathode taps 40 and anode taps 50 with the electrode leads 60, 70, an inner top end of the battery case 20 is spaced from the electrode assembly 30.

Since secondary batteries including the foregoing pouch type battery mostly undergo activation of the battery by charge-discharge in a process of manufacturing a battery cell, gas generated during activation should be removed in order to manufacture a final battery cell and this operation may be called a 'degassing' operation.

However, the conventional process for manufacturing a pouch type battery as described above, entails some problems in that: considerable time is required to remove gas in a degassing operation wherein a sealed end is cut and gas is degassed, in turn increasing production costs; and the gas and excess electrolyte are not completely eliminated, in turn causing not a few failures in a sealing operation through thermal fusion.

Accordingly, there is still a high requirement for techniques to solve conventional problems described above.

DISCLOSURE

Technical Problem

Therefore, the present invention is directed to solving conventional problems described above and to overcoming technical restrictions in the related art.

More particularly, an object of the present invention is to provide a process for easily and rapidly conducting a degassing operation by separating electrolyte and gas from each other through centrifugal force, wherein the electrolyte and the gas have different densities.

Another object of the present invention is to provide a secondary battery manufactured by the foregoing process.

Technical Solution

In order to accomplish the foregoing objects, a method for manufacturing a battery cell including an electrode assembly and electrolyte provided in a battery case made of a laminate sheet having a resin layer and a metal layer according to the present invention may include:

(a) mounting the electrode assembly in the battery case and sealing the periphery of the battery case except for one end part thereof through thermal fusion;

(b) introducing the electrolyte through the unsealed end part and sealing the end by thermal fusion;

(c) charging-discharging the battery cell to activate the same;

(d) transferring gas generated during activation and excess electrolyte to the foregoing end part of the battery cell by centrifugal force; and (e) removing the gas and excess electrolyte from the end part.

Therefore, according to the present invention, the gas generated during activation or the like may be moved to the end part of the battery cell described above by centrifugal force, to thereby easily and rapidly remove the gas generated in an activation operation, compared to any conventional method for manufacturing a battery cell.

In fact, since gas-liquid separation occurs by separation of materials due to a difference in densities thereof caused by centrifugal force, even a gas entrapped in the electrolyte and hardly removed in a degassing operation may be easily eliminated.

For reference, a lithium secondary battery may include, for example, a cathode active material comprising a lithium transition metal oxide such as $LiCoO_2$, as well as an anode active material comprising a carbon material, and the battery may be fabricated by interposing a polyolefin based porous separator between the anode and the cathode and introducing a non-aqueous electrolyte containing a lithium salt such as $LiPF_6$ therebetween. When the battery is charged, lithium ions in the cathode active material are discharged and enter the carbon layer in the anode. On the other hand, during discharge, lithium ions in the anode carbon layer are discharged and enter the cathode active material. In this regard, the non-aqueous electrolyte may function as a medium to move the lithium ions between the anode and the cathode. Such a lithium secondary battery must primarily be stable in the range of operating voltage of the battery and have performance to deliver ions at a sufficiently high speed.

However, the electrolyte is decomposed on the surface of an anode active material during continuous charging and discharging, thus generating gas, while an SEI film is formed on the surface of the anode active material at the early charging and discharging to inhibit further generation of the gas. Accordingly, operation (c) for activating the battery cell is needed to form the SEI film and is necessarily performed before a final stage of completing the battery cell.

In a preferred embodiment, the laminate sheet according to the present invention may have a laminate structure comprising an external resin layer, a metal layer for shielding air and moisture and a thermally fusible internal resin layer.

The external resin layer must have excellent resistance against the external environment, therefore, desired tensile strength and weather-proof properties are required. In such aspects, a polymer resin for an external coating layer may include polyethylene naphthalate (PEN), polyethylene terephthalate (PET) or stretched nylon, which have excellent tensile strength and weather-proof properties.

The external coating layer may comprise polyethylene naphthalate (PEN) and/or be provided with a polyethylene terephthalate (PET) layer at an outer face thereof.

Polyethylene naphthalate (PEN) exhibits superior tensile strength and weather-proof properties while having a small thickness, compared to polyethylene terephthalate (PET), thereby being preferably employed as an external coating layer.

The polymer resin of the internal resin layer may be a polymer resin which has thermal fusibility (thermal adhesiveness) and low absorption of an electrolyte to inhibit penetration thereof, and undergoes minimal expansion or corrosion by the electrolyte. More preferably, the polymer resin may comprise non-stretched (commonly known as 'casting') polypropylene film (CPP).

According to a preferred embodiment, a laminate sheet of the present invention may have a structure comprising the external coating layer having a thickness of 5 to 40 μm, a barrier layer having a thickness of 20 to 150 μm and an internal sealant layer having a thickness of 10 to 50 μm. If each of these layers in the laminate sheet is too thin, it is difficult to improve shielding functions to a material and strength thereof. On the contrary, if the layer is too thick, processing thereof may become more difficult while causing an increase in thickness of the sheet, thus not being preferable.

The electrode assembly may have a variety of structures including, for example, a winding type, stack type and/or stack/folding type structure, and so forth.

An electrode assembly may have a cathode/separator/anode structure to form a secondary battery and, in general, be classified into a jelly-roll (winding type) assembly and a stack (laminate type) assembly on the basis of the foregoing structures. The jelly-roll type electrode assembly may be fabricated by applying an electrode active material to a metal foil used as a current collector, drying and pressing the same, cutting off the pressed material into a band form having desired width and length, isolating an anode and a cathode using a separator, and winding the band form product in a spiral form. Although the jelly-roll type electrode assembly is suited to formation of a cylindrical battery, it has disadvantages such as detachment of an electrode active material, low space utility, etc. in applying to an angular or pouch type battery. On the other hand, a stack type electrode assembly comprises a structure of sequentially stacking plural cathode and anode units, and has an advantage of easily forming an angular battery. However, problems such as complicate processes in fabricating the assembly and short circuit occurring due to thrust of an electrode when external impact is applied thereto, may be encountered.

In order to overcome the foregoing problems, an electrode assembly having an improved structure, which is a combination of the jelly-roll type and the stack type assemblies described above, has been developed and called a 'stack/folding type electrode assembly' wherein a full cell having a predetermined unit size of a cathode/separator/anode structure or a bi-cell having a predetermined unit size of a cathode (anode)/separator/anode (cathode)/separator/cathode (anode) structure is folded using a continuous separator film having a long length.

The full cell is a cell consisting of a unit structure of cathode/separator/anode, wherein the cathode and the anode are positioned at both ends of the cell, respectively. Such a full cell may be a cell having a primary structure of cathode/separator/anode, or comprise a cathode/separator/anode/separator/cathode/separator/anode structure.

Alternatively, the bi-cell may comprise a cell having identical electrodes positioned at both ends of the cell, such as a cathode/separator/anode/separator/cathode unit structure or an anode/separator/cathode/separator/anode unit structure. In the description, a cell having a cathode/separator/anode/separator/cathode structure may be referred to as a "C type bi-cell" while a cell having an anode/separator/cathode/separator/anode structure may be called an "A type bi-cell." That is, the C type bi-cell includes cathodes positioned on both sides of the cell while the A type bi-cell includes anodes positioned at both sides thereof.

Such a bi-cell is not particularly restricted in terms of number of cathodes, anodes and/or separators thereof so long as the electrodes provided at both sides of the cell have the same construction.

The full-cell and the bi-cell may be fabricated by combining a cathode and an anode while interposing a separator therebetween. Such combination may be performed by, for example, thermal fusion.

According to the present invention, the battery case may have different shapes and, preferably, is rectangular in a plan view. In this case, an end part thereof may be an edge portion.

In such a structure, a width of one edge may be 20 to 300% larger than a width of the other edges and, during activation through thermal fusion, the end of the above edge may be sealed.

In order to afford a space in which gas generated during activation is entrapped, one edge may be formed to have a larger width than the other edges as described above, and the end of the edge may be sealed before an activation operation. If the battery case is sealed without such a (free) space, the gas generated during activation may induce swelling and, after gas removal, a re-sealing space may not be present, thus not being preferable.

Consequently, if the width of one edge is less than 20% of each width of the other edges, a desired amount of gas cannot be sufficiently entrapped in a space in the above edge. On the other hand, when the width of the above edge exceeds 300% of each width of the other edges, edge extent may be increased, in turn increasing production costs. Therefore, the foregoing is not preferable in terms of economic aspects.

Operation (d) may include mounting the battery cell on a centrifugal separator while the afore-mentioned end part of the battery cell faces the inside of the centrifugal separator and rotating the same, to entirely move the gas toward the end part of the battery cell. Considering the limited internal space of the battery case, excess electrolyte may also migrate together with the gas to the end part.

The centrifugal separator may include, for example, a horizontal rotator, a vertical rotator, or a fixed angle rotator that rotates at a predetermined angle to a horizontal or vertical direction. However, since the force of gravity acts in the vertical direction, the sum of force (centrifugal force+gravity), that is, a vector sum may differently act according to a rotational position. Accordingly, a horizontal rotator capable of generating centrifugal force perpendicular to gravity is more preferably used.

When the centrifugal force is incurred, a material having a relatively high density may be concentrated at a portion far from the center of rotation. On the contrary, a low density material may be centralized near the center of rotation. Therefore, in order to move a gas having a lower density than the electrolyte toward the end part, the battery cell is mounted to allow the end part thereof to face the inside of the rotator and is then rotated.

The electrolyte and the gas are liquid and gas, respectively, and have a considerable difference in density therebetween. Accordingly, the centrifugal separator does not need high rotational force or centrifugal force equal to that of a general centrifugal separator. Also, in consideration of a sealing strength of a laminate type battery case, desired number of rotations ('rotational frequency') and rotational time are required. According to a preferred embodiment, a centrifugal separator may have a rate of rotation ranging from 200 to 5000 rpm, preferably, 500 to 3000 rpm, and a rotational time ranging from 1 to 30 seconds, preferably, 2 to 15 seconds. If the rotational speed and time are less than the above ranges, gas entrapped in the electrolyte is insufficiently separated. On the contrary, when the foregoing parameters exceed the above ranges, a sealed part of the laminate type battery case may be damaged or an electrode assembly may encounter shape deformation, thus not being preferable.

The centrifugal separator may comprise a rotational axis in the center part and a gripper to fix the battery cell around the periphery of the rotational axis. The gripper may be a structure to secure a part of a face contacting the rotational axis of the battery cell, a structure to secure the entirety of a face contacting the rotational axis of the battery cell, or a cartridge type structure to secure all four faces of the battery cell.

If the secured face is large, it may be stably fixed. However, a problem of decreasing progress of a process may be caused. The centrifugal separator may be provided with a gripper in a suitable range thereof, in consideration of the rate of rotation.

Operation (e) for removing the gas and excess electrolyte from the end part is not particularly limited. For instance, after cutting out a sealing tip of the end part, the gas and excess electrolyte may be removed. Otherwise, after sealing a part adjacent to a reception part of the electrode assembly, the part in which the gas is entrapped may be removed or, otherwise, the gas and excess electrolyte may be exhausted using a pipeline.

According to a preferred embodiment, operation (e) may include:

(e1) puncturing an unsealed part in the end part to form a through-hole communicating with the inside of the battery case; and (e2) pulling top and bottom faces of the battery case in the opposite direction to each other at the unsealed part to open the same while applying vacuum pressure, to thereby remove excess electrolyte as well as gas generated during activation.

Since the foregoing method includes an operation of puncturing the unsealed part in the end part to form a through-hole communicating with the inside of the battery case and an operation of pulling the top and bottom faces of the battery case at the unsealed part to open the same while applying vacuum pressure thereto, the gas generated in an activation operation and excess electrolyte may be easily and rapidly removed, compared to a conventional method for manufacturing a battery cell. In addition, since the gas as well as excess electrolyte are completely eliminated under vacuum, quality of the battery cell may be enhanced.

More preferably, pulling the top and bottom faces of the battery case in the opposite direction to each other by a suction device while applying vacuum pressure thereto may enable the gas generated in the battery cell to be easily exhausted to the outside by the suction device having increased suction under vacuum. Moreover, since the suction device pulls the top and bottom faces of the battery case towards each other, an internal height of the unsealed part may be increased, to thereby enhance suction ability.

For example, the suction device may comprise a first suction pad contacting the top face of the battery case and a second suction pad contacting the bottom face of the same.

In such a structure, each of the first and second suction pads may have a structure comprising an adhesion part contacting the outer side of the battery case and a hollow part that is connected to the adhesion part, communicates with a through-hole formed at an unsealed part of the battery case and applies vacuum pressure.

The present invention may also include a means for accelerating activation of the battery cell to rapidly entrap the gas in the unsealed part.

As an example of the acceleration described above, the method for manufacturing a battery cell may include heating the battery cell in order to increase a temperature of the electrolyte during at least one of operations (c) to (e), thus improving flowability.

If the above heat application to the battery cell is included in operation (c) for activating the battery cell, heat may influence charge-discharge of the battery cell. Therefore, the application of heat to the battery cell is preferably added to any one of operations (d) and (e).

Specifically, in the case where heating is conducted in operation (d) for applying centrifugal force, the gas entrapped in the electrolyte may have increased energy to easily separate the electrolyte and the gas, thus being preferable.

In such a construction, a temperature of the heat application may range from about 40 to 80° C., for example. If the temperature is less than 40° C., activation of the battery cell cannot be performed by desired charge-discharge. When the temperature exceeds 80° C., activation of the battery cell is over-activated (hyperactive) and may cause a problem of explosion of the battery cell, thus not being preferable.

According to another embodiment, applying ultrasonic vibration to the battery cell may be included in at least one of operations (c) to (e), to increase flowability of the electrolyte.

However, in the case where the application of ultrasonic vibration to the battery cell is included in operation (c) for activating the battery cell, it may influence charge-discharge of the battery cell. Therefore, the application of ultrasonic vibration to the battery cell is preferably included in at least one of operations (d) and (e).

Specifically, as with the heat application, ultrasonic vibration applied in operation (d) for applying centrifugal force may facilitate detachment of the gas entrapped in the electrolyte, enabling easy separation of the gas and the electrolyte and thus being preferable.

In such a construction, an ultrasonic frequency may range from about 15 kHz to 100 kHz.

Meanwhile, a method for manufacturing a battery cell according to the present invention may further include sealing the inside of the unsealed part through thermal fusion and cutting off the other (outer) part, after operation (e) described above.

Also, the present invention may provide a battery cell manufactured by the foregoing method.

The battery cell may be a lithium secondary battery. The lithium secondary battery may comprise a cathode, an anode, a separator and a non-aqueous electrolyte containing lithium.

The cathode may be fabricated by, for example, mixing a cathode mix in a solvent such as NMP to prepare a slurry then applying the slurry to an anode current collector, followed by drying and rolling the same.

The cathode mix may optionally include a conductive material, a binder, a filler, etc., in addition to a cathode active material.

The cathode active material may be a material capable of undergoing electro-chemical reaction, and comprise a lithium transition metal oxide, which contains two or more transition metals, for example; a lamellar compound such as lithium cobalt oxide ($LiCoO_2$), lithium nickel oxide ($LiNiO_2$), etc. which is substituted with one or more transition metals; lithium manganese oxide substituted with one or more transition metals; lithium nickel oxide represented by $LiNi_{1-y}M_yO_2$ (wherein M=Co, Mn, Al, Cu, Fe, Mg, B, Cr, Zn or Ga, the oxide contains at least one of these elements, and y satisfies $0.01 \leq y \leq 0.7$); lithium nickel cobalt manganese composite oxide represented by $Li_{1+z}Ni_bMn_cCo_{1-(b+c+d)}M_dO_{(2-e)}A_e$ (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si or Y, and A=F, P or Cl) such as $Li_{1+z}Ni_{1/3}Co_{1/3}Mn_{1/3}O_2$, $Li_{1+z}Ni_{0.4}Mn_{0.4}Co_{0.2}O_2$; olefin-based lithium metal phosphate represented by $Li_{1+x}M_{1-y}M'_yPO_{4-z}X_z$ (wherein M is a transition metal, preferably, Fe, Mn, Co or Ni, M'=Al, Mg or Ti, X=F, S or N, and $-0.5 \leq x \leq +0.5$, $0 \leq y \leq 0.5$, $0 \leq z \leq 0.1$), and so forth, without being particularly limited thereto.

The conductive material is generally added in an amount of 1 to 30 wt. % relative to a total weight of a mixture including the cathode active material. Such conductive material is not particularly restricted so long as it has conductive properties without causing chemical modification of the battery. The conductive material may include, for example: graphite such as natural graphite or artificial graphite; carbon black such as carbon black, acetylene black, ketchen black, channel black, furnace black, lamp black, summer black, etc.; conductive fibers such as carbon fiber or metal fiber; metal powder such as carbon fluoride, aluminum, nickel powder, etc.; conductive whiskers such as zinc oxide, potassium titanate, etc.; conductive metal oxides such as titanium oxide; conductive substances such as polyphenylene derivatives, and the like.

The binder described above assists in combination of an active material with a conductive material and bonding to a current collector and is normally added in an amount of 1 to 30 wt. %, relative to a total weight of a mixture containing a cathode active material. Examples of such binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorinated rubber, various copolymers, and so forth.

The filler is a supplementary ingredient to inhibit expansion of a cathode, is optionally used and is not particularly restricted so long as it comprises fibrous materials without causing chemical modification of a battery. The filler may include, for example, olefin polymers such as polyethylene, polypropylene, etc., fibrous materials such as glass fiber or carbon fiber, and so forth.

The cathode current collector described above is generally fabricated to have a thickness in the range of 3 to 500 μm. Such cathode current collector is not particularly restricted so long as it has conductivity without causing chemical modification of a battery. For example, the cathode current collector may be fabricated using stainless steel, aluminum, nickel, titanium, calcined carbon, or aluminum or stainless steel surface-treated with carbon, nickel, titanium or silver, and so forth. The current collector may be processed to have fine irregularities on the surface thereof, so as to enhance adhesion to an electrode active material. In addition, the current collector may have various forms including films, sheets, foils, nets, porous structures, foams, non-woven fabrics, etc.

The anode used herein is fabricated by, for example, applying an anode mix containing an anode active material to an anode current collector then drying the coated collector, and the anode mix may optionally include the foregoing components, that is, the conductive material, the binder, the filler, etc.

Examples of the anode active material may include: carbon and graphite materials such as natural graphite, artificial graphite, expanded graphite, carbon fiber, non-graphitizing carbon (often referred to as 'hard carbon'), carbon black, carbon nanotubes, fullerene, activated carbon, etc.; metals alloyable with lithium, such as Al, Si, Sn, Ag, Bi, Mg, Zn, In, Ge, Pb, Pd, Pt, Ti, etc., as well as compounds containing the same; combination of carbon and graphite materials with metals and compounds thereof; lithium containing nitrides, and so forth. Among these, carbon active materials, silicon active materials, tin active materials or silicon-carbon active materials are preferably used and these materials may be used alone or in combination of two or more thereof.

The anode current collector is generally fabricated to have a thickness in the range of 3 to 500 μm. Such anode current collector is not particularly restricted so long as it has high conductivity without causing chemical modification of a battery. For example, the anode current collector may be fabricated using copper, stainless steel, aluminum, nickel, titanium, calcined carbon, copper or stainless steel surface-treated with carbon, nickel, titanium or silver, aluminum-cadmium alloy, and so forth. Similar to the cathode current collector, the anode current collector may be processed to have fine irregularities on the surface thereof, so as to enhance adhesion to an electrode active material. In addition, the anode current collector may have various forms including films, sheets, foils, nets, porous structures, foams, non-woven fabrics, etc.

The separator used herein is interposed between the cathode and the anode and may be formed using a thin insulation film having a high ion permeability and excellent mechanical strength. The separator typically has a pore diameter of 0.01 to 10 μm and a thickness of 5 to 300 μm. As the separator, a sheet or non-woven fabric made of olefin polymer such as polypropylene and/or glass fibers or polyethylene, which have chemical resistance and hydrophobicity, are used. When a solid electrolyte comprising polymer is employed as the electrolyte, the solid electrolyte may also serve as the separator.

The non-aqueous electrolyte containing lithium salt used herein comprises a lithium salt as well as a non-aqueous electrolyte. The non-aqueous electrolyte may be a non-aqueous organic solvent, organic solid electrolyte, inorganic solid electrolyte, or the like.

The non-aqueous organic solvent may be an aprotic organic solvent including, for example: N-methyl-2-pyrrolidinone; propylene carbonate; ethylene carbonate; butylene carbonate; dimethyl carbonate; diethyl carbonate; γ-butyrolactone; 1,2-dimethoxyethane; tetrahydroxyfuran; 2-methyl tetrahydrofuran; dimethyl sulfoxide; 1,3-dioxolane; formamide; dimethyl formamide; dioxolane; acetonitrile; nitromethane; methyl formate; methyl acetate; phosphoric triester; trimethoxymethane; dioxolane derivatives; sulfolane; methyl sulfolane; 1,3-dimethyl-2-imidazolidinone; propylene carbonate derivatives; tetrahydrofuran derivatives; ether; methyl propionate; ethyl propionate, or the like.

Examples of the organic solid electrolyte may include polyethylene derivatives, polyethylene oxide derivatives, polypropylene oxide derivatives, phosphoric ester polymers, poly agitation lysine, polyester sulfide, polyvinyl alcohol, polyvinylidene fluoride, polymers having ionic dissociation groups, or the like.

Examples of the inorganic solid electrolyte may include nitrides, halides and/or sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—NiOH, $Li_3PO_4$—$Li_2S$—$SiS_2$, etc.

The lithium salt used herein is a material readily dissolved in the non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3L_1$, $CF_3SO_3Li$, $(CF_3SO_2)_2NLi$, chloroborane lithium, low aliphatic carboxylic lithium, lithium 4-phenyl borate, imides, or the like.

Additionally, in order to improve charge-discharge properties and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethyleneglycol dialkyl ether, ammonium salts, pyrrole, 2-methoxy ethanol, aluminum trichloride, or the like, may be added to the non-aqueous electrolyte. If necessary, in order to impart non-flammability, the non-aqueous electrolyte may further include halogen-containing solvents such as carbon tetrachloride and ethylene trifluoride. Further, in order to improve high-temperature storage characteristics, the non-aqueous electrolyte may further include carbon dioxide gas.

The secondary battery fabricated according to the present invention may be used for a battery cell which is a power source for a small device, and also be employed as a unit cell of a medium and/or large-scale battery module having a plurality of battery cells, which requires high temperature stability, long cycle characteristics and high rate properties.

Preferred examples of medium and/or large-scale devices described herein may include: power tools operated by power from a battery motor; electric automobiles including, for example, electric vehicles (EV), hybrid electric vehicles (HEV), plug-in hybrid electric vehicles (PHEV), etc.; electric two-wheel vehicles including, for example, electric bikes, electric scooters, etc.; electric golf carts, and so forth, without being particularly limited thereto.

BRIEF DESCRIPTION OF THE DRAWINGS

The above and other objects, features and other advantages of the present invention will be more clearly understood from the following detailed description taken in conjunction with the accompanying drawings, in which.

BEST MODE

Hereinafter, exemplary embodiments of the present invention will be described in greater detail with reference to the following examples. However, those skilled in the art will appreciate that these embodiments are proposed for illustrative purposes and do not restrict the scope of the present invention.

FIGS. 2 through 7 are schematic views illustrating a method for manufacturing a battery cell according to an exemplary embodiment of the present invention.

Referring to these drawings together with FIG. 11, a method for manufacturing a battery cell will be described in detail below.

Figure 1:
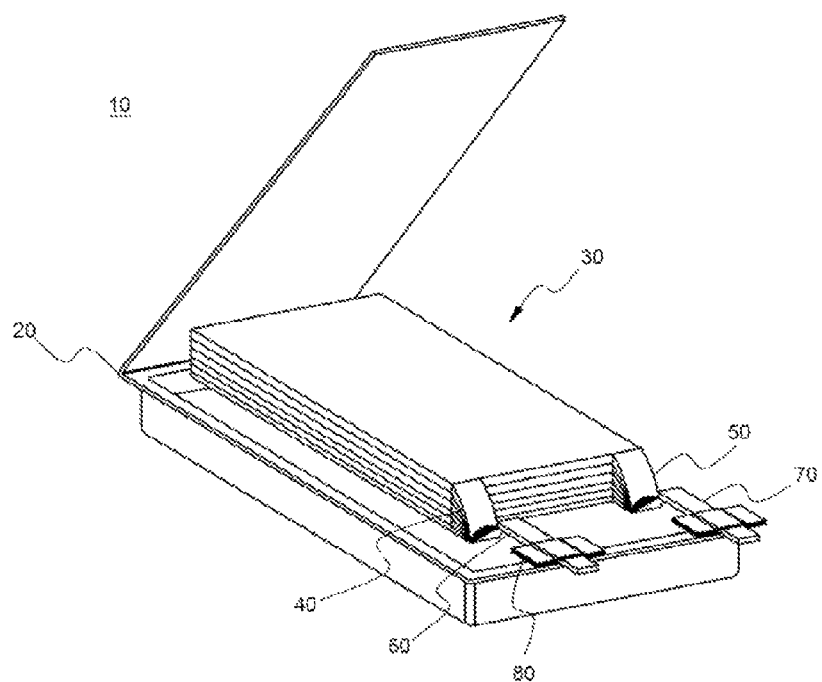
FIG. 1 is an exploded perspective view illustrating a typical structure of a conventional pouch type battery.
Figure 2:
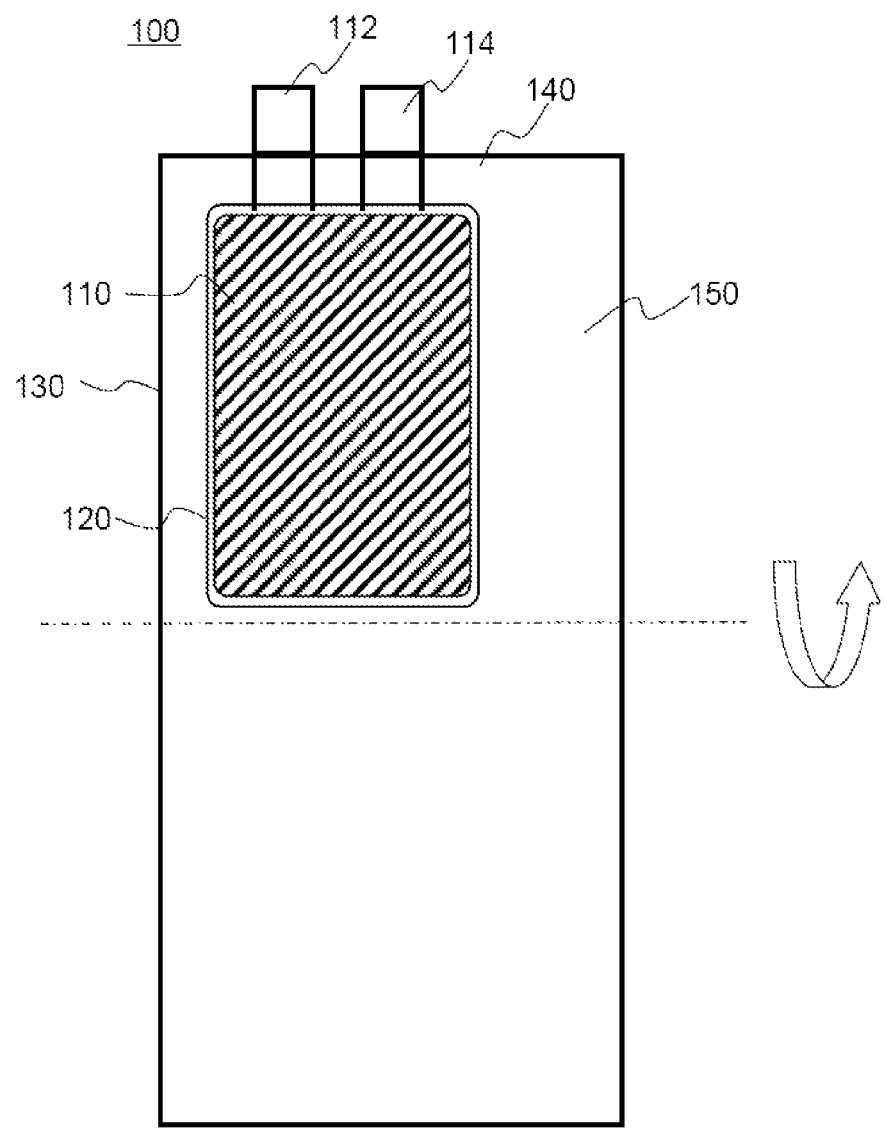
FIGS. 2 through 7 are each schematic views in sequential order, illustrating a method for manufacturing a battery cell according to an exemplary embodiment of the present invention.

First, as shown in FIG. 2, after mounting an electrode assembly 110 on a reception part 120 of a battery case 130, the battery case 130 is folded in half.

Figure 3:
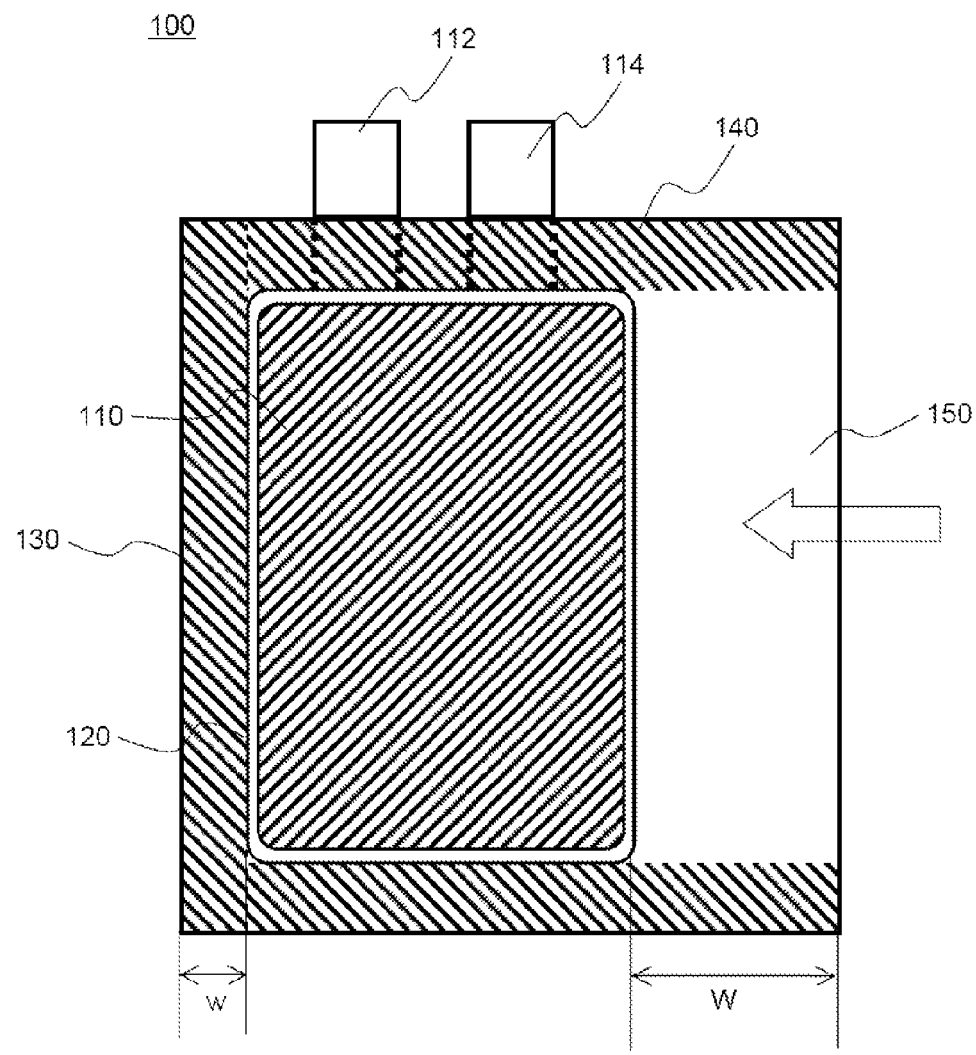

Next, as shown in FIG. 3, as the electrode assembly 110 is mounted on the reception part 120 of the battery case 130, the periphery of the batter case 130 except for an end part 150 thereof is sealed through thermal fusion.

Figure 4:
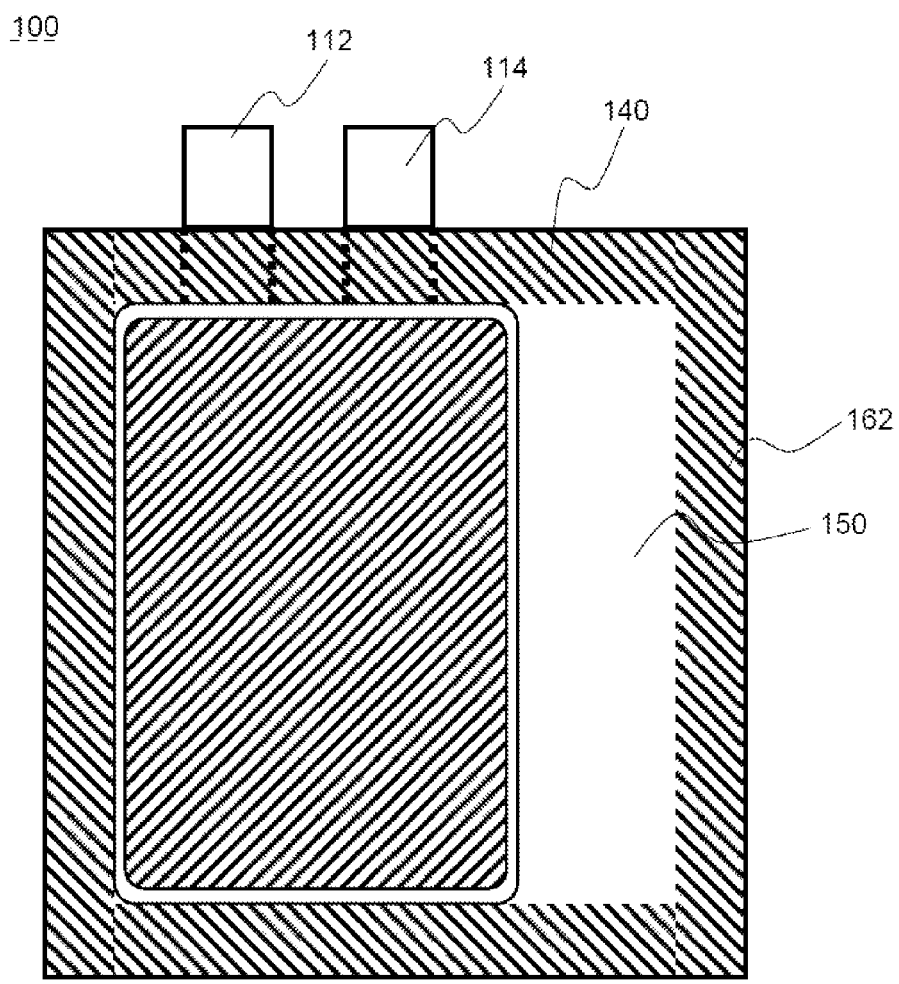

More particularly, the electrode assembly 110 to which electrode terminals 112, 114 are connected, is equipped in the battery case 130 comprised of a laminate sheet while having the reception part 120 at one side. Also, among four sides, a sealing part 140 is formed on three sides including the top side wherein the electrode terminals 112, 114 are provided, by heat compression, while the other side 150 remains unsealed. An electrolyte is introduced through such an unsealed part 150 and then, as shown in FIG. 4, the end 162 of an edge side as the unsealed part 150 undergoes thermal fusion, followed by charging-discharging to activate the battery cell 100.

Figure 5:
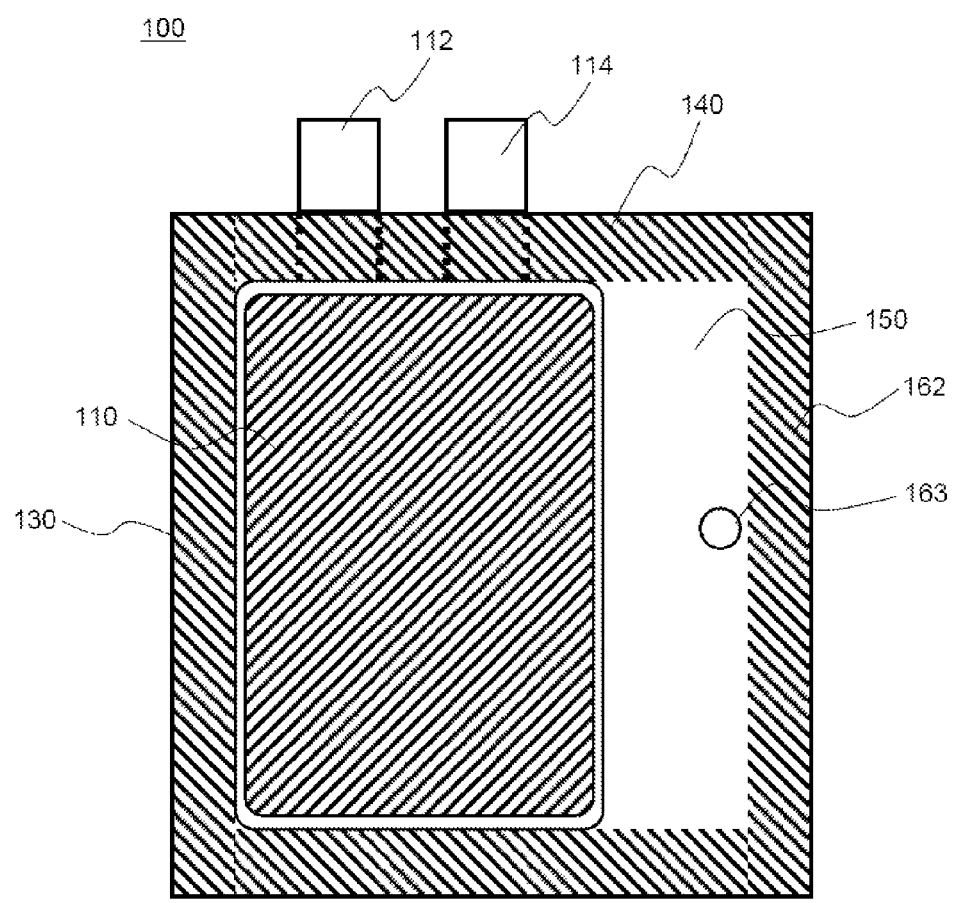
Figure 11:
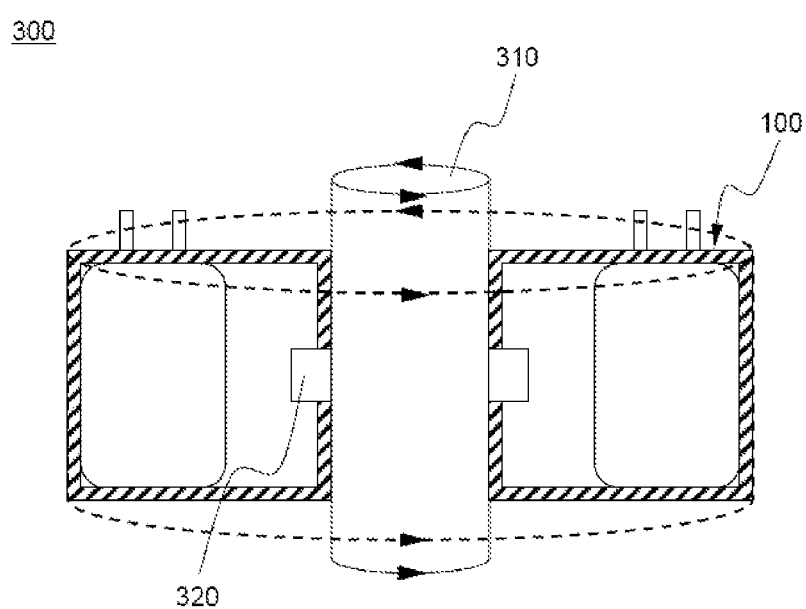
FIG. 11 is a schematic cross-sectional view illustrating a centrifugal separator according to an exemplary embodiment of the present invention.

Next, after separating the electrolyte and the gas using the centrifugal separator shown in FIG. 11, the unsealed part 150 in the end part is punctured to form a through-hole 163 communicating with the inside of the battery case 130 as shown in FIG. 5, followed by pulling top and bottom faces of the battery case 130 in the opposite direction to each other at the unsealed part 150 to open the same while applying vacuum pressure thereto, thereby removing excess electrolyte as well as gas generated during activation.

Figure 6:
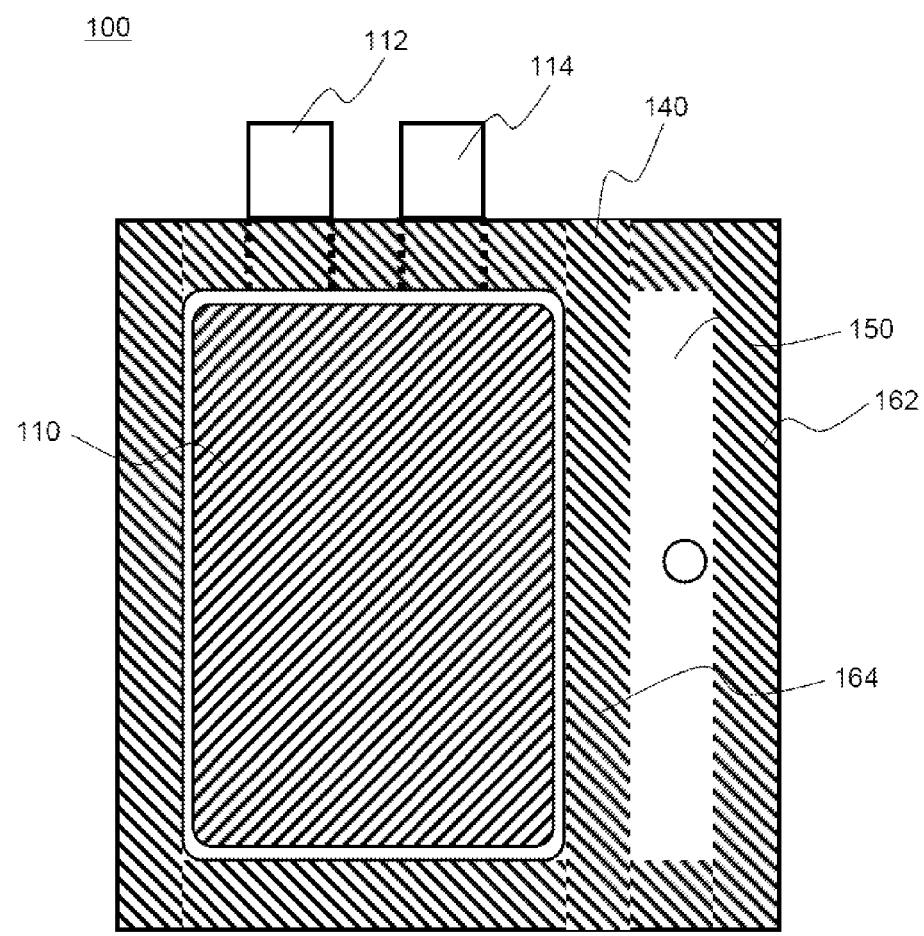
Figure 7:
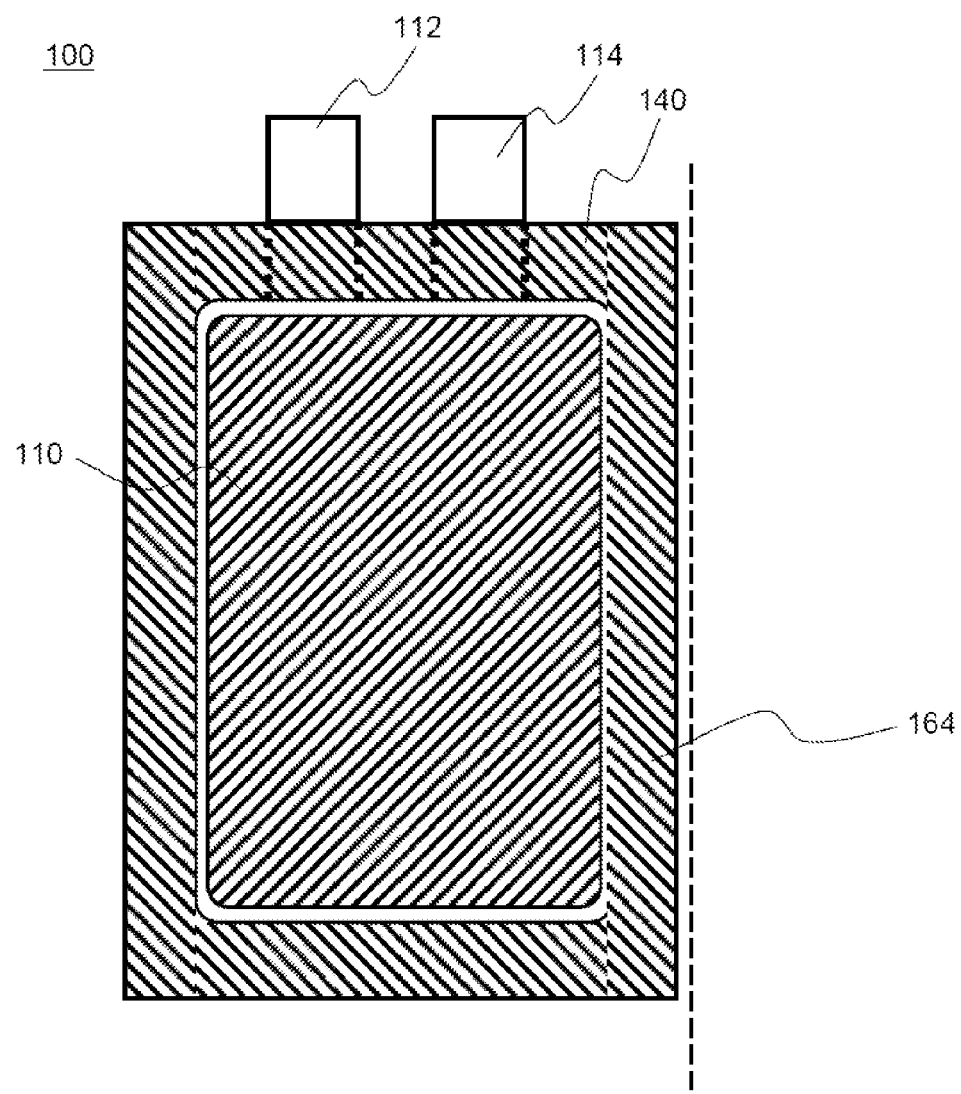

Lastly, as shown in FIGS. 6 and 7, after sealing the inner side 164 of the unsealed part adjacent to the electrode assembly 110 through thermal fusion, the other outer part is cut off to complete the battery cell 100.

In addition, the battery case 130 may have a rectangular structure in plan view, wherein a width 'W' of an edge side 150 is 200% larger than each width 'w' of the other edge sides.

Figure 8:
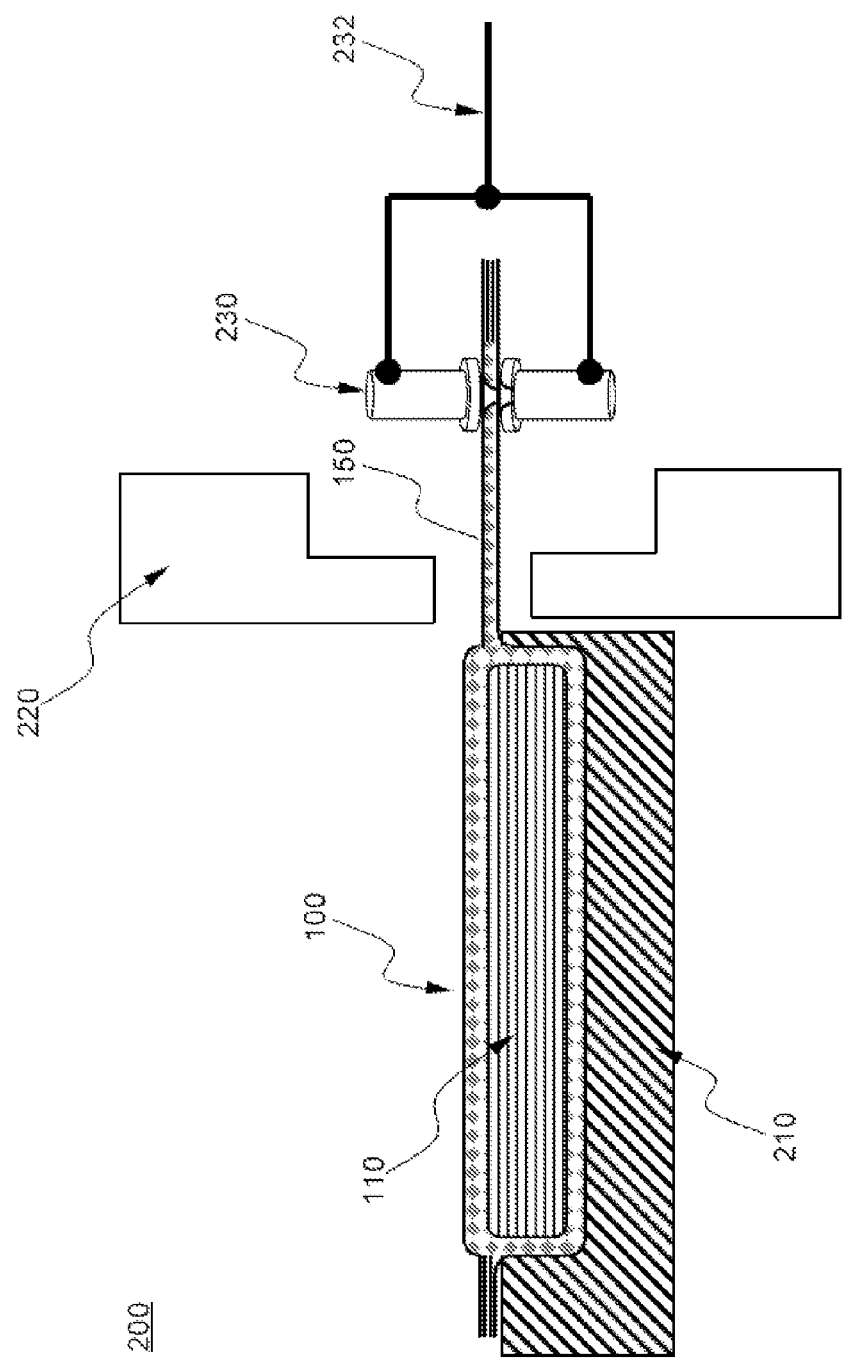
FIGS. 8 through 10 are each cross-sectional views illustrating a gas removal apparatus according to another exemplary embodiment of the present invention.
Figure 9:
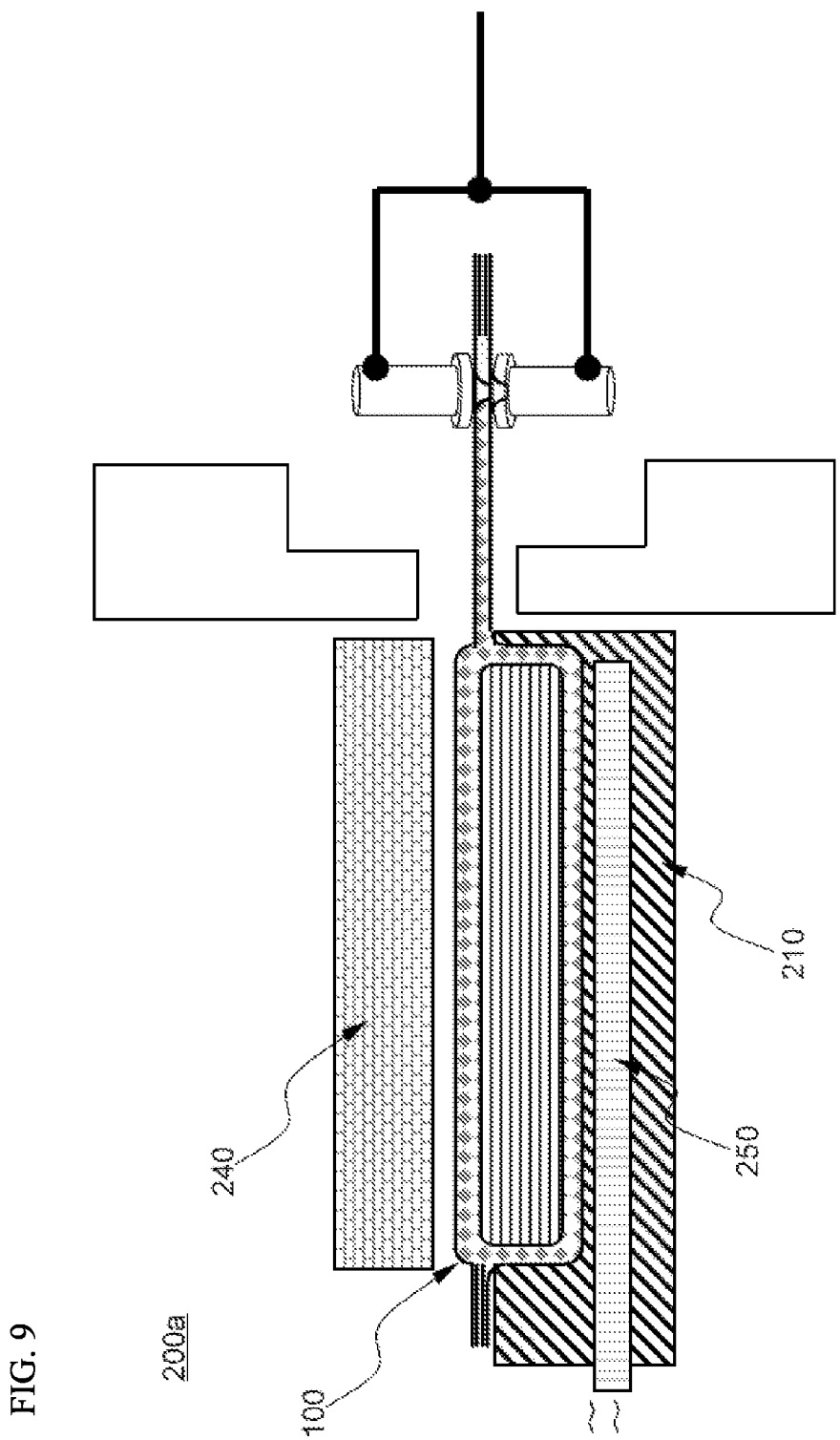
Figure 10:
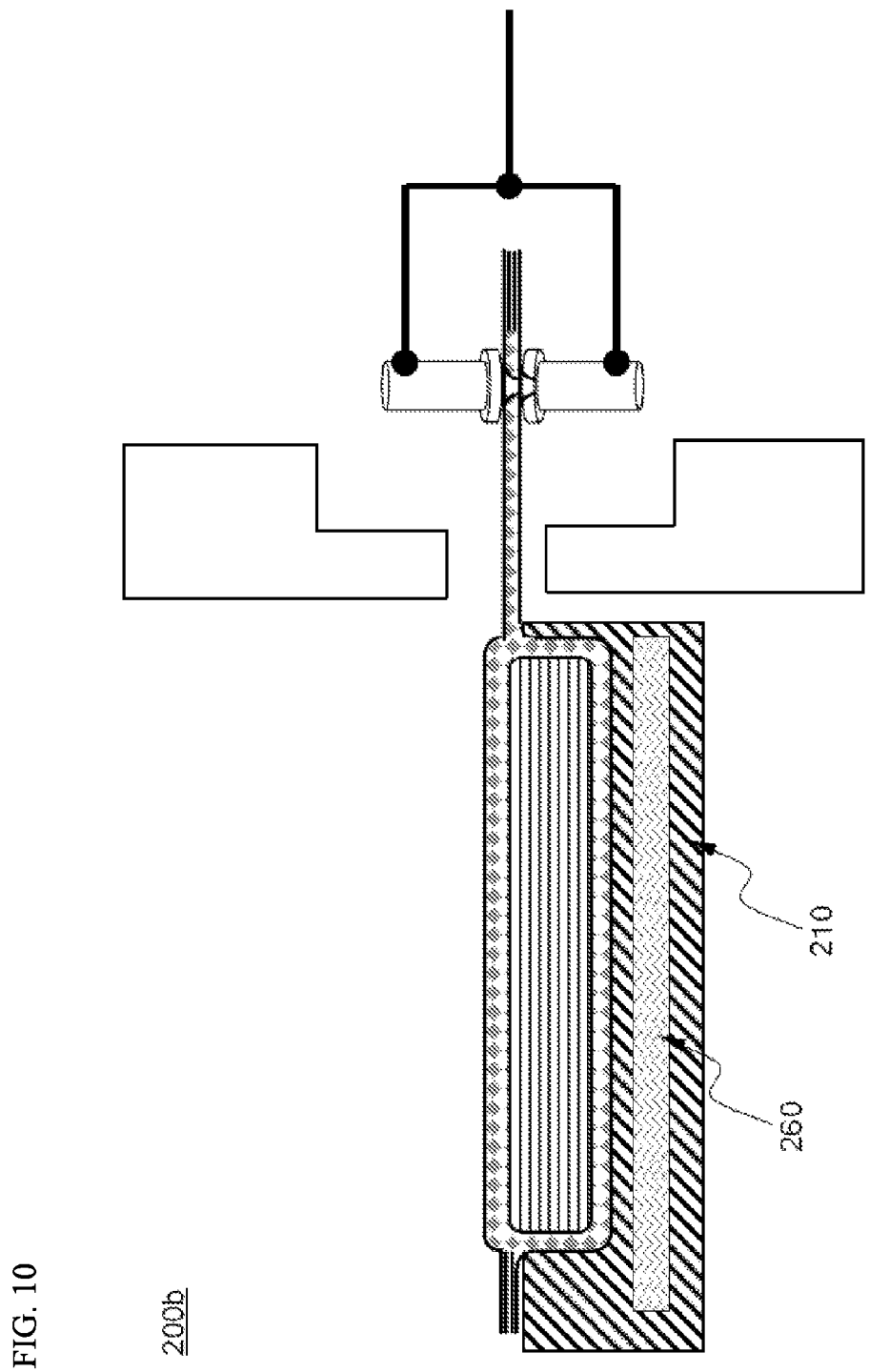

FIGS. 8 through 10 illustrate schematic cross-sectional views of a gas removal apparatus according to another embodiment of the present invention.

First, referring to FIG. 8 as well as FIG. 5, the gas removal apparatus 200 is used in a process of removing excess electrolyte as well as the gas generated in the operation of activating the battery cell, and comprises a holder 210, a pair of sealing blocks 220, a suction device 230, and a vacuum suction line 232 connected with the suction device 230.

The holder 210 may be provided with the battery cell 100 such that the end part 150 of the battery case 130 having a through-hole 163 formed therein is protruded in one direction, and the sealing block 220 is provided at the outer side of the holder 210 in order to seal the end part 150 of the battery case 130 through thermal fusion.

The suction device 230 may pull and open the top and bottom faces of the battery case in opposite directions at the end part 150 of the battery case 130 having the through-hole 163 formed therein while applying vacuum pressure, thus removing excess electrolyte as well as the gas generated in the activation operation.

A gas removal apparatus 200a shown in FIG. 9 is substantially identical to the gas removal apparatus 200 shown in FIG. 8, except that a gas removing device 200a has a press block 240 positioned at top of the battery cell 100 to press down the top of the battery cell 100 and a heater 250 is equipped inside the holder 210 to heat the battery cell 100 and increase kinetic energy of the gas. Therefore, a detailed description thereof will be omitted. However, the press block 240 may of course be included in both the apparatus 100 shown in FIG. 8 and an apparatus 200b in FIG. 10.

The gas removing apparatus 200b in FIG. 10 is substantially identical to the removing apparatus 200 shown in FIG. 8, except that an ultrasonic vibrator 260 for applying ultrasonic vibration to the battery cell 100 to increase kinetic energy of the gas is equipped inside the holder 210. Therefore, a detailed description thereof will be omitted.

In this regard, each of the first suction pad 230a and the second suction pad 230b may have a construction of an adhesion part 234 contacting the outer side of the battery case 130 and a hollow part 236 that is connected to the adhesion part 234 and communicates with a through-hole 163 formed at the unsealed part 150 of the battery case 130 to which vacuum pressure is applied.

FIG. 11 is a schematic cross-sectional view illustrating a centrifugal separator according to an exemplary embodiment of the present invention.

Referring to FIG. 11, the centrifugal separator 310 has a rotational axis 310 at the center part and a gripper 320 mounted on an outer side of the rotational axis 310 to secure the battery cell 100. Each gripper 320 grips a battery cell 100 and rotates the same, in turn causing separation of the electrolyte and the gas by centrifugal force. Although the gripper 320 partially secures a face contacting the rotational axis 310 of the battery cell 100, as shown in FIG. 11, it may also comprise a structure of fixing the entirety of the face contacting the rotational axis 310 or be a cartridge type gripper securing all of four faces of the battery cell 100.

Although preferred embodiments of the present invention have been described above in conjunction with the accompanying drawings, those skilled in the art will appreciate that various modifications and variations are possible without departing from the scope and spirit of the invention, based on the foregoing description.

[Industrial Applicability]

As apparent from the foregoing, the method for manufacturing a battery cell according to the present invention includes: conducting charge-discharge to activate the battery cell; and separating electrolyte and gas generated during activation by centrifugal force, to thereby rapidly and completely remove excess electrolyte as well as gas generated in the activation operation.

The invention claimed is:

1. A method for manufacturing a battery cell including an electrode assembly and electrolyte provided in a battery case made of a laminate sheet having a resin layer and a metal layer, comprising:
   (a) mounting the electrode assembly in the battery case and sealing the periphery of the battery case except for one end part of the battery case through thermal fusion;
   (b) introducing the electrolyte through the end part of the battery case and sealing the end part of the battery case via thermal fusion;
   (c) charging-discharging the battery cell to activate the battery cell;
   (d) transferring gas generated during activation and excess electrolyte to the end part of the battery case by centrifugal force; and
   (e) removing the gas and excess electrolyte from the end part of the battery case,
   wherein, in step (d), the battery cell is mounted on a centrifugal separator to make the end part of the battery case face an inside of the centrifugal separator and then rotated, enabling the gas to migrate to the end part of the battery case by centrifugal force.

2. The method according to claim 1, wherein the laminate sheet has a laminate structure comprising an external resin layer, a barrier metal layer for shielding air and moisture, and a thermally fusible internal resin layer.

3. The method according to claim 1, wherein the electrode assembly has a winding type, stack type or stack/folding type structure.

4. The method according to claim 1, wherein the battery case has a rectangular structure in a plan view and the end part of the battery case is one edge side of the battery case.

5. The method according to claim 4, wherein a width of the edge side is 20 to 300% larger than each width of the other edge sides and the end of the edge side is sealed during thermal fusion for activation.

6. The method according to claim 1, wherein, in operation (d), an entirety of the gas migrates to the end part of the battery case by centrifugal force.

7. The method according to claim 1, wherein operation (e) includes: (e1) puncturing an unsealed part in the end part of the battery case to form a through-hole communicating with the battery case; and (e2) pulling top and bottom faces of the battery case in an opposite direction to each other at the unsealed part to open the top and bottom faces of the battery case while applying vacuum pressure thereto, to remove excess electrolyte as well as the gas generated during activation.

8. The method according to claim 7, wherein the top and bottom faces of the battery case are pulled in opposite directions by a suction device while applying vacuum pressure thereto.

9. The method according to claim 8, wherein the suction device comprises a first suction pad contacting the top face of the battery case and a second suction pad contacting the bottom face of the battery case.

10. The method according to claim 9, wherein each of the first suction pad and the second suction pad has a structure comprising an adhesion part contacting an outer side of the battery case and a hollow part that is connected to the adhesion part, communicates with a through-hole formed at an unsealed part of the battery case and applies vacuum pressure.

11. The method according to claim 1, wherein heating the battery cell is conducted in at least one of operations (c) to (e).

12. The method according to claim 1, wherein ultrasonic vibration is applied to the battery cell in at least one of operations (c) to (e).

13. The method according to claim 1, further comprising an operation of sealing an inner side of the unsealed part through thermal fusion and then cutting off other outer parts, after operation (e).

* * * * *